United States Patent
Wagenaar et al.

(10) Patent No.: US 7,335,888 B2
(45) Date of Patent: Feb. 26, 2008

(54) IMAGING APPARATUS TO ACQUIRE TOMOGRAPHY PROJECTIONS WITH IMPROVED ORBIT

(75) Inventors: Douglas Jay Wagenaar, South Barrington, IL (US); Grant Albert, Elgin, IL (US); Alexander Hans Vija, Evanston, IL (US); Darrell Dennis Burckhardt, Hoffman Estates, IL (US); Jinhun Joung, Algunquin, IL (US)

(73) Assignee: Siemens Medical Solutions USA, Inc., Malvern, PA (US)

( * ) Notice: Subject to any disclaimer, the term of this patent is extended or adjusted under 35 U.S.C. 154(b) by 106 days.

(21) Appl. No.: 11/234,954

(22) Filed: Sep. 26, 2005

(65) Prior Publication Data

US 2006/0065839 A1     Mar. 30, 2006

Related U.S. Application Data

(60) Provisional application No. 60/612,747, filed on Sep. 24, 2004.

(51) Int. Cl.
*G01T 1/166* (2006.01)
(52) U.S. Cl. .......................... 250/363.05; 250/363.08; 378/10; 378/11
(58) Field of Classification Search ........... 250/363.05, 250/363.08; 378/10, 11
See application file for complete search history.

(56) References Cited

U.S. PATENT DOCUMENTS

| | | | | |
|---|---|---|---|---|
| 5,376,796 A | * | 12/1994 | Chan et al. | 250/363.04 |
| 5,591,977 A | * | 1/1997 | Green et al. | 250/363.03 |
| 5,751,000 A | * | 5/1998 | McCroskey et al. | 250/363.03 |
| 5,838,009 A | * | 11/1998 | Plummer et al. | 250/363.05 |
| 6,020,589 A | * | 2/2000 | Plazenet et al. | 250/363.04 |
| 6,470,068 B2 | * | 10/2002 | Cheng | 378/20 |
| 6,496,557 B2 | * | 12/2002 | Wilson et al. | 378/21 |
| 6,906,328 B2 | * | 6/2005 | Garrard et al. | 250/363.1 |
| 2006/0072699 A1 | * | 4/2006 | Mackie et al. | 378/4 |

* cited by examiner

*Primary Examiner*—David Porta
*Assistant Examiner*—Jessica L Eley

(57) ABSTRACT

The present invention relates to an apparatus for nuclear medicine imaging in which the imaging platform is attached directly to the detectors for nuclear imaging to allow for minimal constant distance between the detector(s) and the object to be imaged. As the detector moves around the object to be imaged to capture different angular views of the object, the imaging platform is rotated in a compensatory manner to maintain a its long axis perpendicular to gravity during movement of the detector. An advantage of this configuration over prior systems is the ability to obtain multiple angular projections while the distance between the detector and the object being imaged is maintained at a minimum, but the danger of detector-object collision is minimized and the necessity for orbital path calibration to preserve precision of detector movement and distance is eliminated.

13 Claims, 3 Drawing Sheets

IMAGING APPARATUS TO ACQUIRE TOMOGRAPHY PROJECTIONS WITH IMPROVED ORBIT

BACKGROUND OF THE INVENTION

1. Technical Field

This invention relates to the field of medical imaging, and specifically to a medical imaging apparatus that enables exploitation of the motion of an imaging detector to acquire differing views of the object to be imaged.

2. Description of the Background Art

Nuclear medicine imaging, for example PET or SPECT, uses radiation to acquire images that can show both the anatomy and the function of organs or tissues in a patient's body or other object of interest. In nuclear medicine imaging, radiopharmaceuticals are introduced into the body. These radiopharmaceuticals are attracted to specific organs or tissues and produce gamma emissions which leave the body or object. One or more detectors are positioned or move around the patient or object to be imaged to detect the gamma radiation emitted from the patient's body. This information is processed by computer to calculate the point of origin of the gamma radiation. Accumulation of a large number of gamma positions allows the instrument to display an image of the object under study.

In PET imaging, two 511 keV gamma rays are simultaneously produced upon decay or annihilation of a positron and travel in opposite directions. Scintillation detectors on opposite sides of the object being imaged produce an electrical pulse when the gamma ray interacts with a scintillation crystal. When the two detectors simultaneously produce an electrical pulse on opposite sides of the object, detecting the decay of a positron, the line connecting the positions where the gamma ray was detected is assumed to pass through the point where it originated. In single photon imaging, a collimator is placed in front of the scintillation crystal detector. The collimator allows only gamma rays aligned with the holes in the collimator to pass through to the detector. Thus, the line of origin of the gamma radiation is inferred from the alignment of the collimator and the detector.

Many nuclear medicine imaging systems are designed with detectors that move about the object being imaged. For example, nuclear medicine gamma cameras (detectors) perform single photon emission computed tomography (SPECT), a procedure in which an object to be imaged traditionally is placed on a rigid, horizontal imaging platform or imaging bed while one or more gamma cameras orbit the object, acquiring multiple images from different views. The images captured from different angles are reconstructed mathematically to provide a three-dimensional image of the object. In the majority of these prior art apparatuses, the gamma cameras are physically attached to an annular device which rotates, moving the detectors in a circular orbit around a stationary axis of rotation and the separate, stationary imaging platform. In this way, the detectors can capture projection views of the object from many different angles.

In known imaging systems, the object being imaged and the platform on which it is supported during imaging is not attached in any way to the imaging detector system. This configuration results in several engineering challenges. The angle of the detector is coupled to an imaginary reference frame in space. In SPECT and other imaging methods, image quality degrades with increasing distances between the detector and the object being imaged. Therefore, this distance should be minimized. However, orbital motion combined with minimization of distance from the object creates a potential for collision of the detector with the object being imaged, which could damage the delicate instrumentation of the detector and injure a patient being imaged. To ensure safety of the imaging apparatus, it is thus necessary to include a collision detection mechanism or other means to prevent detector-object collision.

Additional challenges in systems which require the detector to orbit a stationary axis of rotation are the need for maintaining the object within the same field of view of the camera or detector during its orbital motion while keeping the distance between the object and the detector to a minimum for each projection view. The design of currently known systems, constructed with the detector systems mounted onto an annular device which limits the motion to a defined orbital path, allows the detectors the necessary range of angular projections and defines a repeatable detector pathway that can be covered by a protective barrier to avoid collisions. The distance between the detector and the object being imaged, however, is not minimized, resulting in less than maximal image quality.

Prior systems also have provided radial motion to the detector systems, which allows the angle of the detector relative to the imaging platform to be adjusted so that the distance to the object being imaged can be minimized but remain constant during the imaging process. For this type of apparatus, the stationary position of the imaging platform and the orbital motion of the detector must be calibrated, a "center of rotation" calibration. This calibration must be performed periodically as the apparatus is used and parts for setting the radial position of the detectors become worn. Other prior systems have instead employed multiple non-rotating but adjustable detectors to provide simultaneous, parallel acquisition of different projection angles.

Thus, currently available medical imaging apparatuses, for example apparatuses for SPECT, acquire projection angle images from a number of angles either by movement of the expensive and fragile but heavy and cumbersome detectors to gain different angular perspectives of the object to be imaged, or using a sufficient number of detectors positioned about the object such that movement is not necessary. Precise and controlled movement of the detector systems is difficult due to their size, mass and fragility. The need to bring the detectors as close to the object as feasible in order to optimize image quality requires that the detectors move radially, however this radial freedom of motion creates the potential for object-detector collisions and the potential for uncertainty to the position of the detector with respect to the object as the detector is brought to different angular positions.

There is a need in the art for medical imaging apparatuses which overcome the disadvantages of the currently available systems, in particular the disadvantages created by a system in which detectors are required move to different angles in orbit around a stationary object.

SUMMARY OF THE INVENTION

This invention overcomes the problems in the prior art, by providing apparatus for acquiring tomographic image projections with simplified movement and reduced or eliminated calibration procedures.

Accordingly, in one embodiment, this invention is directed to medical imaging apparatus for imaging an object, which includes a stationary gantry that supports an imaging detector; orbital movement hardware that creates new angular positions for the detector; an imaging detector; an angular compensation rotator; an imaging platform; and an angular position determinator; wherein the imaging platform is physically attached to the imaging detector via the angular compensation rotator by hardware, which permits rotational movement of the imaging platform relative to said imaging detector body, and wherein the angular compensation rotator rotationally adjusts the angular position of the imaging platform in response to imaging detector body angular position information determined and communicated by the angular position determinator to maintain the imaging platform in a horizontal position.

BRIEF DESCRIPTION OF THE FIGURES

The accompanying drawings, which are incorporated herein and form part of the specification, illustrate various embodiments of the present invention. These drawings, together with the description, further explain the principles of the invention and enable a person skilled in the pertinent art to make and use the invention. In the drawings, like reference numbers indicate identical or functionally similar elements.

DETAILED DESCRIPTION OF THE PREFERRED EMBODIMENTS

Figure 1:
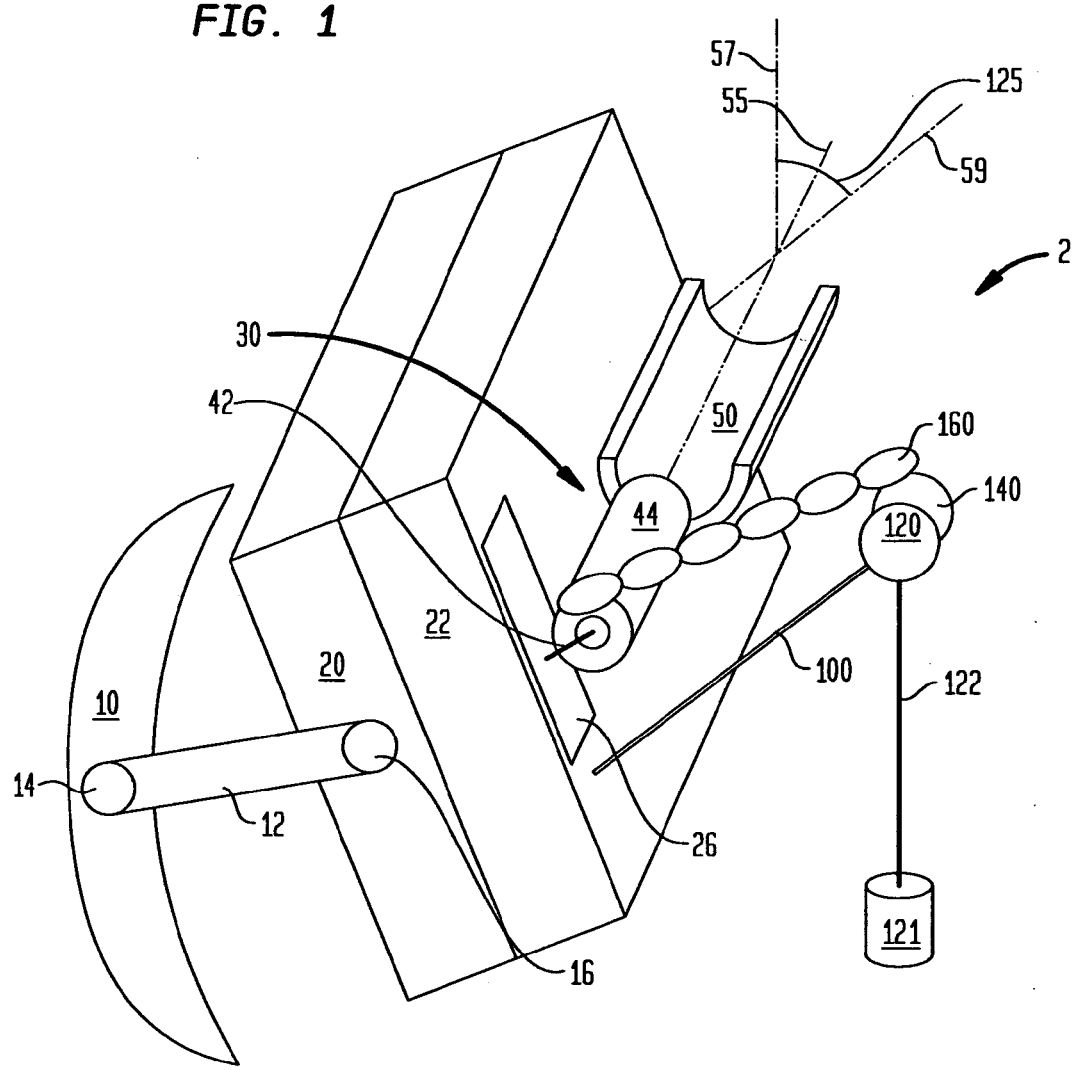
FIG. 1 is a graphical representation in the form of a diagram of a medical imaging apparatus according to one embodiment of the present invention.

This invention provides, in some embodiments, a medical imaging apparatus that allows the detectors to remain in close proximity to the imaging platform at all viewing angles with reduced mechanical alignment requirements and improved safety. The apparatus of the invention is particularly useful for any nuclear medicine imaging modality or any imaging modality based upon spontaneous or stimulated electromagnetic radiation from within an object to be imaged (such as, for example to detect a signal from a contrast agent or an emitter of fluorescent electromagnetic radiation administered to a patient) or based upon electromagnetic radiation or massive particles passing through an object to be imaged. Preferred uses for the inventive apparatus are nuclear medical imaging. Therefore, the present invention can be used with medical imaging including, but not limited to, conventional nuclear medicine, X-ray computed tomography, imaging (including fluorescence) which detects visual, near infrared, infrared or ultraviolet light, or any type of medical imaging based on detection of electromagnetic radiation or passing through or from within a patient or other object.

The mechanism of the inventive apparatus exploits existing mechanisms, such as known orbital gantry systems, that change a detector's angular position relative to the gravitational vector by providing an imaging platform to hold the object being imaged that is physically attached to the detector at a fixed distance. This configuration allows the detector to maintain a small and constant distance from the object to be imaged, thus maximizing image quality, while reducing the dangerous potential for collision between the detector and the object being imaged. Another advantage of the inventive system is that the same part of the detector continues to view the object, thus greatly reducing the need for region-to-region normalization calibration which exists in the situation where the object is viewed by different parts of the detector at different angles. Since the object remains within the field-of-view, and the same region of the collimator/detector is in use for all angles, uniformity corrections are simplified in the nuclear medicine application of the inventive apparatus. The invention allows existing orbital gantry systems to be used with any collimator or lens/filter to acquire close proximity images of smaller objects (such as human infants and children or laboratory animals) without the need to redesign the gantry to accommodate them.

The imaging platform is rotated to compensate for changes in its angular position relative to the gravitational vector due to movement of the detector. The long axis of the imaging platform, on which the object to be imaged rests, thereby remains perpendicular to the Earth's gravitational directional vector while the detector moves around the imaging platform at a constant distance from it. The detector may be positioned at any angle or through any range of angels without regard to adjusting the position of the detector relative to the fixed axis of rotation. The angle of the detector is de-coupled from a reference frame in space since the object reference frame is attached to the detector itself. This allows the detector to remain at minimal distance from the imaging platform and the object to be imaged while improving safety by eliminating the potential for the detector to collide with the object or the imaging platform. In this invention, the imaging platform and the detector are in constant relative position and a center-of-rotation calibration is unnecessary.

For optimal operation of the apparatus according to this invention, the detector preferably is approximately the same size as or larger than the object to be imaged. If a detector is much smaller than the object, portions of the object can be left out of the field of view of the detector during imaging and absence of data with respect to these parts of the object can result in imaging artifacts. Therefore, preferably the detector or detectors are no smaller than the longest dimension of the object to be imaged allows.

The object to be imaged is placed in a horizontal position on the imaging platform of the apparatus and should be immobile with respect to the imaging platform such that no part of the object can accidentally move or protrude into the space between the imaging platform and the detector surface (i.e. the gap between the imaging bed and the detector) where it can be caught or pinched and potentially damaged or injured. Any object of suitable size may be imaged with the apparatus of this invention. The apparatus and the detectors may be scaled for efficient imaging of and use with objects of various sizes, including adult human beings, human children and infants, animals of different sizes such as primates (humans, monkeys, etc.), canines, swine, rodents (mice, rats, hamsters, guinea pigs, etc.) and the like, and test objects (i.e. phantoms).

PET and single photon imaging detectors are available commercially. Any medical imaging detector is suitable for use with the invention. Large area scintillation detectors made with sodium iodide crystals doped with thallium, lutetium oxyorthosilicate and ytterbium oxyorthosilicate (phoswich) detectors or cadmium zinc telluride solid state detectors, for example, may be used with the invention.

Preferably, for SPECT applications the detector is overlaid with a collimator of any of the known designs.

Alternatively, a protective cover or a lens or filter may overlay the detector for optical imaging or other types of imaging. In some applications, the detector can be operated without any overlay or cover.

In summary, the rotational apparatus of the present invention is attached to a medical imaging detector means via a hardware interface. The rotational apparatus itself comprises three main components: (1) an angular position determination device, (2) an angular compensation rotator device and (3) the imaging platform. In operation, the angular measurement device measures the angle of the detector relative to the gravitational vector any other fixed vector and conveys the value of the measured angle to an angular compensation rotator device, which adjusts the angle of the imaging platform with respect to the detector to maintain the imaging platform horizontal and stationary with respect to the floor on which the medical imaging detector sits. The top and bottom of the imaging platform, on which the object being imaged rests, remain parallel to the horizontal plane, i.e. perpendicular to the gravitational vector.

The angular position determination device is any device that can provide a measurement of the angle between the surface of the imaging detector and a fixed vector such as the gravitational vector. The angular compensation rotator device can be any device that can physically adjust the movement of the imaging platform to maintain it in a stationary and horizontal position during imaging while the imaging detector and/or imaging detector front move in an orbital path around the imaging platform.

Figure 2:
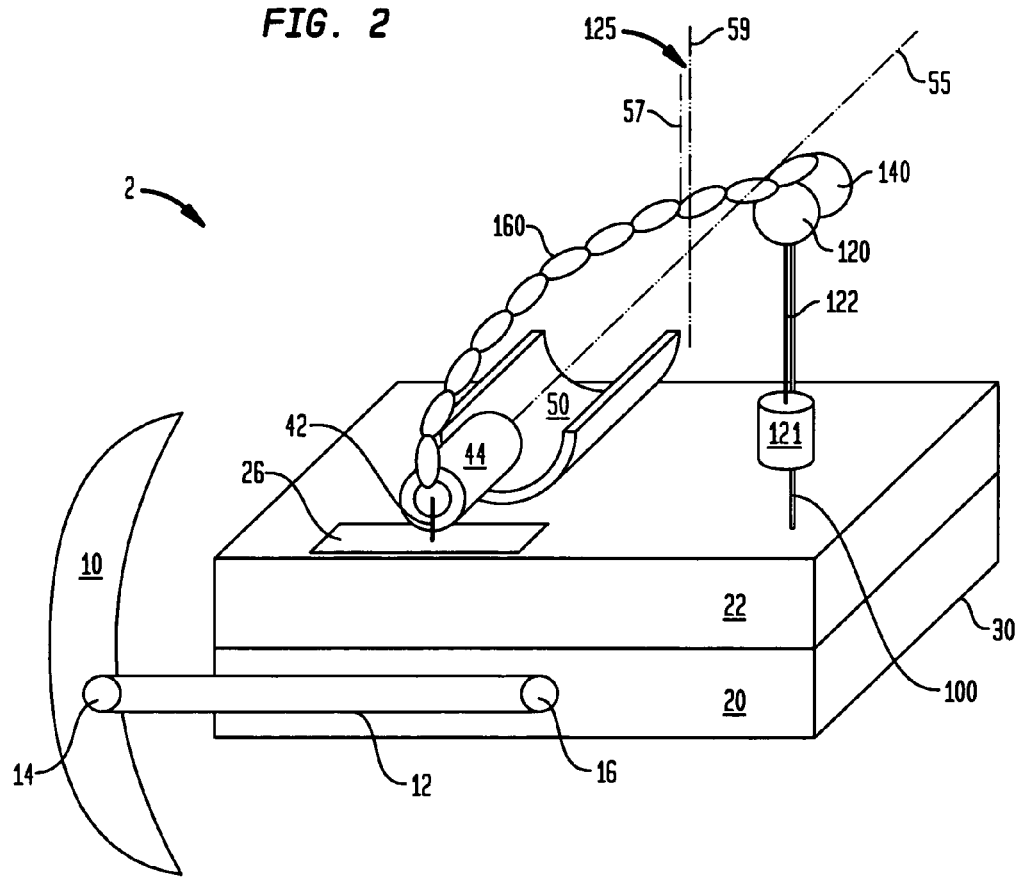
FIG. 2 is a graphical representation in the form of a diagram of a medical imaging apparatus according to one embodiment of the present invention.

Referring to FIGS. 1 and 2, according to one embodiment of the invention, a preferred medical imaging apparatus 2 comprises a stationary gantry 10 that supports the medical imaging detector 20 and provides an orbital movement mechanism 12, 14, 16 by which the angular position of the detector 20 can be altered with respect to the room in which the apparatus 2 sits. Orbital gantries for use in movement of medical imaging detectors during medical imaging are known in the art. Any of the known mechanisms, are suitable for use with the invention. Hardware, here exemplified by a system of two pulleys 14, 16 and a cable 12, connects the medical imaging detector 20 to the gantry 10 and allows the medical imaging detector 20 to be moved to different angular positions in an orbital path.

The medical imaging detector 20 optionally is attached to a medical imaging detector front 22. In preferred embodiments, the imaging detector front 22 is detachable from the medical imaging detector 20 and is a collimator, for example a parallel hole, converging, diverging or pinhole collimator. Alternatively, the medical imaging detector front 22 is a lens, a filter or a protective cover as described above.

Attached to the imaging detector front 22, or alternatively when the optional imaging detector front 22 is absent, to the imaging detector 20, is hardware 26 that moveably connects the imaging detector 20 and, when present, the imaging detector front 22, to the imaging platform 50 via an angular compensation rotator mechanism 44. The angular compensation rotator mechanism 44 is attached to one or more imaging platform(s) 50 and rotates said imaging platform(s) 50 in response to a signal received by the transmission mechanism 140, 160. The transmission mechanism 140, 160 communicates a signal, determined by the angular position determination mechanism 120, 122, 121, which indicates the angular position of the imaging detector 20 with respect to the gravitational vector 57, to the angular compensation rotator mechanism 44. The transmission mechanism 140, 160 may be a mechanical means such as gears and chains, as depicted in FIGS. 1 and 2, or may be any electrical, electronic or wireless transmission means. When multiple imaging platforms are in use, a single angular position determination means may transmit information concerning the angular position of the medical imaging detectors 20, 22 to each imaging platform, each of which is rotated in response to the signal by a separate angular compensation rotator mechanism 44 in parallel.

In response to the signal transmitted from the angular position determination mechanism 120, 122, 121, the angular compensation rotator mechanism 44 rotates the imaging platform 50 such that the imaging platform 50 is maintained level to the gravitational vector. This mechanism assures that the imaging platform 50, although physically coupled to the imaging detector which is in orbital motion, remains level, with its longitudinal axis 55 in a constant position relative to the gravitational vector and that the object to be imaged (not shown, see FIG. 3) which rests on the imaging platform 50 during imaging can remain positioned thereon. The angular compensation rotator mechanism 44 receives an input signal (i.e. a mechanical, electrical or EM wave signal) that represents a new angular position for the medical imaging detector 20, 22 and rotates the imaging platform 50 such that the imaging platform 50 remains horizontal.

Referring still to FIGS. 1 and 2, the pictured embodiment of the medical imaging apparatus of the invention incorporates an angular position determination mechanism 120, 122, 121. In FIGS. 1 and 2, the angular position determination mechanism is depicted graphically as a pendulum consisting of a weight 121 suspended from a line 122, which is attached to a meter 120 for determining the angular position of the imaging detector 20 relative to gravity (i.e. angle 125). Any suitable means for determination of the angular position of the imaging detector 20 is contemplated for use with the invention.

The angular position determination mechanism 120, 122, 121 is physically or otherwise attached to the imaging detector 20 or the imaging detector front 22, when present, by attachment means 100. The attachment means 100 is depicted in FIGS. 1 and 2 as a physical connection and attachment at a 90° angle to the plane of the medical imaging detector front 22; however in alternative embodiments, the connection may be any connection that allows the angle of the detector 20 to be known relative to the gravitational vector. Examples of suitable connections include, for example, an optical measurement (such as a sextant to measure the angle of the plane of the medical imaging detector 20 or medical imaging detector front 22 relative to the gravitational vector 57) or an electronic connection. Any suitable means may be used to determine the angular position of the detector.

Referring again to FIGS. 1 and 2, line 57 represents the gravitational vector, line 55 represents the longitudinal axis of the imaging platform 50 and line 59 represents the angular position of the medical imaging detector 20. Angle 125 represents the angular position of the medical imaging detector 50 relative to the gravitational vector. In FIG. 2, this angle is 180° and the detector is facing "up." FIG. 1 depicts the medical imaging apparatus 2 when the medical imaging detector 20, 22 is at an arbitrary angle between 0° ("down" or in the same direction as the gravitational vector) and 180° ("up" or in the opposite direction as the gravitational vector).

Figure 3:
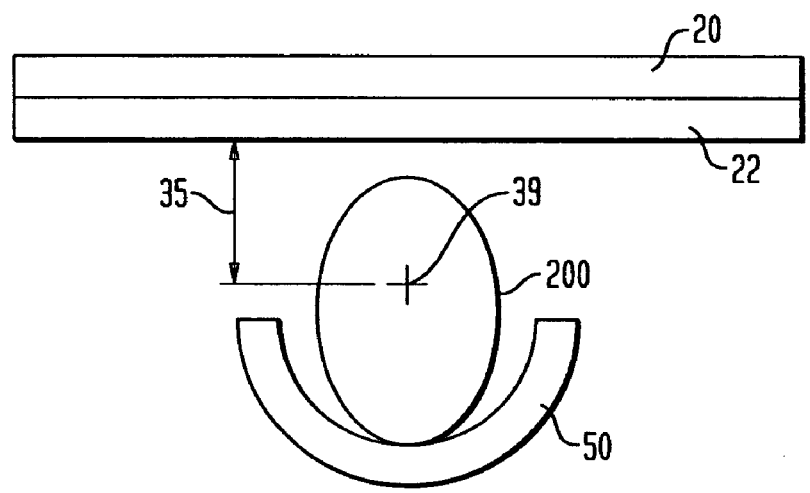
FIG. 3 is a graphical representation in the form of a partial diagram of a medical imaging apparatus according to one embodiment of the present invention.

Referring to FIG. 3, which is a diagram showing a cross-section of the apparatus perpendicular to the long axis of the imaging platform 50 (line 55 in FIGS. 1 and 2), an object to be imaged 200 is shown on the imaging platform 50. The medical imaging detector 20 and medical imaging detector front 22 are shown with an angle of 0° with respect to the gravitational vector. The path of the medical imaging detector 20 is an orbit around the center of the imaging area, which includes the imaging platform 50 and the object to be imaged 200, with a radius 35 and a center 39. The distance 30 (see FIGS. 1 and 2) between the object to be imaged 200 and the surface of the medical imaging detector front 22 (or medical imaging detector 20 when the imaging detector front is absent) preferably is minimal, but the orbital radius 35 of the medical imaging detector 20, 22 should be sufficient to avoid collision with the object 200 during its motion. For added safety of the apparatus, the imaging platform 50 may be fitted with a permanent or detachable device to prevent collision of the imaging detector or the imaging detector front with the object, particularly when the angle of the detector is 0° (top side "down"). The device may be a physical barrier that protects the object or it may be a proximity or collision detector of any suitable type.

When performing medical imaging using a system in which X-rays pass through the object to be imaged, such as X-ray computed tomographic imaging, the X-ray source preferably is attached to the detector/collimator 20, 22 such that the imaging platform remains horizontal as described above and the X-ray source continues to shine into the same area region of the detector, independent of the angular position of the detector.

Figure 4:
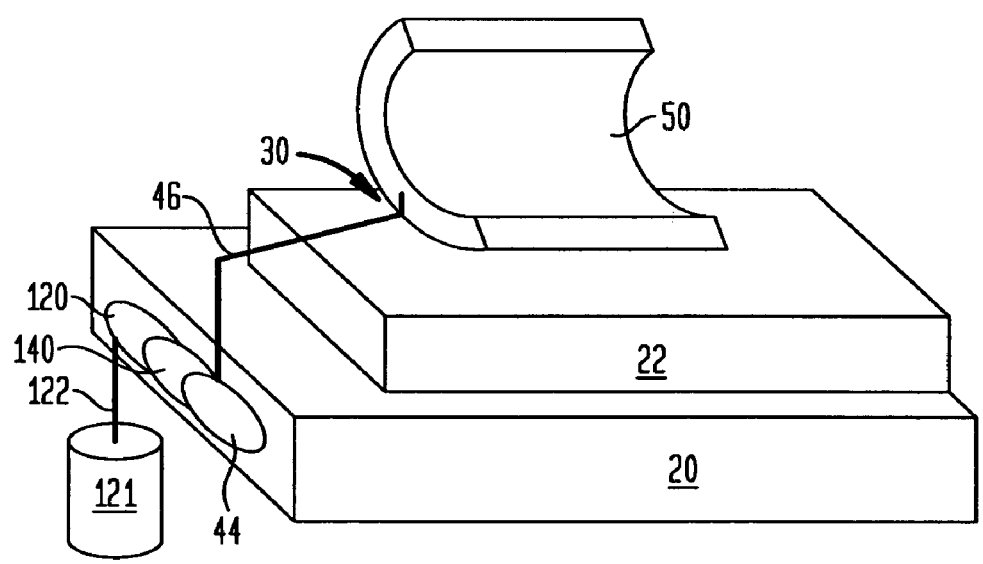
FIG. 4 is graphical representation in the form of a cross-sectional diagram taken at line A, as shown in FIG. 2, of a medical imaging apparatus according to one embodiment of the present invention.

An alternate embodiment of the invention is shown in FIG. 4. In this embodiment, the angular position determination means is physically or otherwise attached to the imaging detector even when an imaging detector front is in place. With this configuration, the medical imaging detector front may be removed and substituted with a different medical imaging detector front without the need for dismantling the angular position determination means or any other part of the apparatus. Different collimators, lenses or filters can easily be substituted, giving more flexibility to the apparatus for different imaging uses. The apparatus may be operated with no medical imaging detector front in place, as well. Preferably, such apparatuses also comprise a means for adjusting the distance between the detector and the imaging platform so that medical imaging detector fronts having different sizes can be accommodated in the apparatus while maintaining the distance between the detector and the object being imaged as small as practicable.

Referring to FIG. 4, the pictured embodiment of the medical imaging apparatus of the invention incorporates an angular position determination means 120, 122, 121. The angular position determination means is depicted graphically as a pendulum consisting of a weight 121 suspended from a line 122, which is attached to a means 120 for determining the angular position of the imaging detector 20 relative to gravity (i.e. angle 125) as in the embodiment depicted in FIGS. 1 and 2. The angular position determination means 120, 122, 121 is physically, electronically or wirelessly connected to the imaging detector 20. The means of connection (not shown) may be any connection that allows the angle of the detector 20 to be known relative to the gravitational vector, as described above in the context of FIGS. 1 and 2. A transmission means 140 communicates the signal, determined by the angular position determination means 120, 122, 121 which indicates the angular position of the imaging detector 20, to the angular compensation rotator means 44. The transmission means 140 may be a mechanical means such as gears and chains, as depicted in FIGS. 1 and 2, or may be any electrical, electronic or wireless transmission means. The angular compensation rotator means 44 is attached to one or more imaging platform(s) 50 via mechanical hardware 46 and causes said imaging platform(s) 50 to rotate in response to a signal received by the transmission means 140. Thus, the imaging platform is maintained horizontal and stationary with respect to the gravitational vector. Therefore, in this embodiment of the invention, the angular position determination means 120, 122, 121 and the angular compensation rotator means 44 are independent of the (optional) medical imaging detector front 22.

The invention as described above may be used in applications of nuclear medicine, for example to detect signals from within an object such as a patient's body due to an administered radiochemical as is known in the art.

The invention claimed is:

1. A medical imaging apparatus for imaging an object, comprising:
   (a) an imaging detector having a first bottom side and a second top side, said top side of said detector receiving imaging information;
   (b) a stationary gantry which supports said imaging detector;
   (c) orbital movement hardware which creates new angular positions for said detector;
   (d) an angular compensation rotator;
   (e) an imaging platform; and
   (f) an angular position determinator;
   wherein said imaging platform is physically attached to said imaging detector via said angular compensation rotator by hardware which permits rotational movement of said imaging platform relative to said imaging detector, and wherein said angular compensation rotator rotationally adjusts the angular position of said imaging platform in response to imaging detector angular position information determined and communicated by said angular position determinator to maintain said imaging platform in a horizontal position.

2. The apparatus of claim 1, which further comprises an imaging detector front disposed on and attached to said top side of said imaging detector and between said imaging detector and said angular compensation rotator.

3. The apparatus of claim 2, wherein said imaging detector front is detachable from said imaging detector.

4. The apparatus of claim 2, wherein said imaging detector front is a collimator.

5. The apparatus of claim 4, wherein said collimator is selected from the group consisting of a parallel hole collimator, a pinhole collimator, a converging collimator and a diverging collimator.

6. The apparatus of claim 2, wherein said imaging detector front is a lens.

7. The apparatus of claim 2, wherein said imaging detector front is a filter.

8. The apparatus of claim 2, which further comprises means for avoiding collision of said imaging detector or said imaging detector front with said object.

9. A method of nuclear medicine imaging of an object comprising placing said object on said imaging platform of the apparatus of claim 1 and imaging said object using said apparatus.

10. A method of nuclear medicine imaging of claim 9, wherein said object is a laboratory animal.

11. A method of nuclear medicine imaging of claim 9, wherein said object is a human patient.

12. A method of nuclear medicine imaging of claim 9, wherein said object is an artificial imaging phantom.

13. A method of nuclear medicine imaging of claim 9, wherein said object is selected from the group consisting of an artificial imaging phantom, a rodent, a swine, mouse, a rat, a hamster, a guinea pig, a lagomorph, a canine, a feline, a monkey, a primate, a human infant, a human child and a human adult.

* * * * *